Aug. 31, 1948.  C. B. TENNENT, SR  2,448,198
MACHINE FOR MAKING CONTAINERS
Filed Aug. 26, 1943  14 Sheets-Sheet 1

Charles B. Tennent, Sr.
By Albert M. Austin
Attorney

Fig. 12ᵃ

Inventor
Charles B. Tennent, Sr.
By Albert M. Austin
Attorney

Aug. 31, 1948.　　　C. B. TENNENT, SR　　　2,448,198
MACHINE FOR MAKING CONTAINERS
Filed Aug. 26, 1943　　　14 Sheets-Sheet 6

Fig. 13.ª

Inventor
Charles B. Tennent, Sr
By
Albert M. Austin
Attorney

Aug. 31, 1948.  C. B. TENNENT, SR  2,448,198
MACHINE FOR MAKING CONTAINERS
Filed Aug. 26, 1943  14 Sheets-Sheet 10

Inventor
Charles B. Tennent Sr
By Albert M. Austin
Attorney

Aug. 31, 1948.   C. B. TENNENT, SR   2,448,198
MACHINE FOR MAKING CONTAINERS
Filed Aug. 26, 1943   14 Sheets-Sheet 12

Inventor
Charles B. Tennent, Sr.
By Albert M. Austin
Attorney

Fig. 22.

Inventor
Charles B. Tennent, Sr.
By Albert M. Austin
Attorney

Patented Aug. 31, 1948

2,448,198

UNITED STATES PATENT OFFICE 2,448,198

MACHINE FOR MAKING CONTAINERS

Charles B. Tennent, Sr., South Richmond, Va., assignor, by mesne assignments, to National Folding Box Company, Incorporated, a corporation of Connecticut Application August 26, 1943, Serial No. 500,047

12 Claims. (Cl. 93—49)

This invention relates to a method and machine for the automatic production of containers made from cardboard, paperboard or similar materials and provided with a hinged cover.

The invention provides as its principal object a method and an automatic machine for the high-speed production of so-called "click-top" containers or boxes the top or cover of which is normally retained and locked in a closed position by a yielding abutment flap arrangement which automatically engages the cover upon closing of the container cover and may be disengaged by the application of a certain amount of force at the cover for the purpose of opening the box or container.

Containers of the "click-top" variety are not claimed herein but form the subject matter of separate patents.

Among other features the invention provides automatic mechanism for the completion of a "click-top" structure which involves a plurality of inter-related folding and gluing operations and combines operations performed on the cover structure of the container with others in well timed relationship in order to produce from a collapsed tubular blank a container ready to be filled with merchandise.

The invention further includes various improvements and novel features having general application to other machinery for the production of containers with and without attached covers.

These and other features, objects and advantages of the invention will appear more fully from the detailed description which follows accompanied by drawings showing, for the purpose of illustration, a preferred embodiment of the invention and a form of "click-top" container which may be made hereon.

The invention also consists in certain new and original features of construction and combination of parts hereinafter set forth and claimed.

Although the novel features which are believed to be characteristic of this invention will be particularly pointed out in the claims appended hereto, the invention itself, its objects and advantages, and the manner in which it may be carried out, may be better understood by referring to the following description taken in connection with the accompanying drawings forming a part thereof in which:

Figs. 3b to 11, inclusive, illustrate successive expanding, folding and gluing operations automatically performed by the container-forming machine, more particularly;

Fig. 14 is an elevational view of the head-end of the machine, a section being taken on line 14—14 of Fig. 15a;

Fig. 15b is a plan view of the delivery-end of the machine;

expanded and folded container structure is ready to receive glue at the under side of outer bottom flap 18 and of the securing tabs 24 and 25, as indicated at g.

Figure 1:
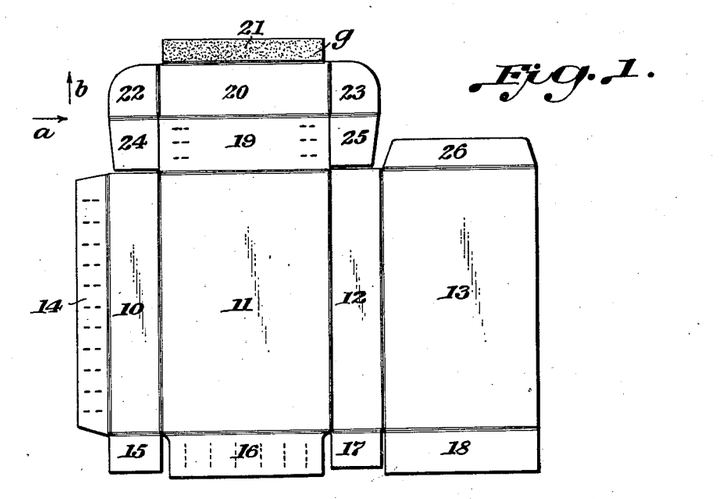
Fig. 1 is a plan view of an illustrative form of blank of a "click-top" container.
Figure 2:
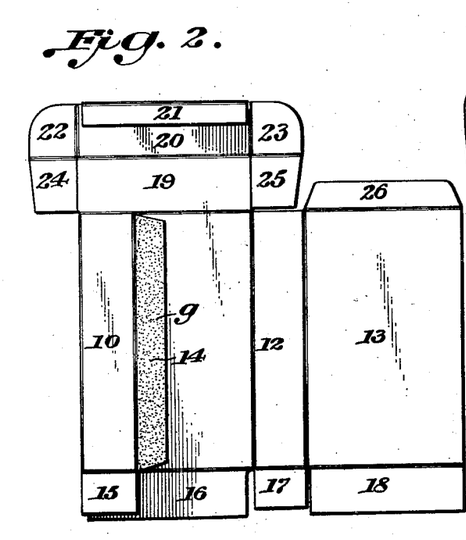
Fig. 2 is a plan view of the blank of Fig. 1 after initial gluing and folding operations.
Figure 3A:
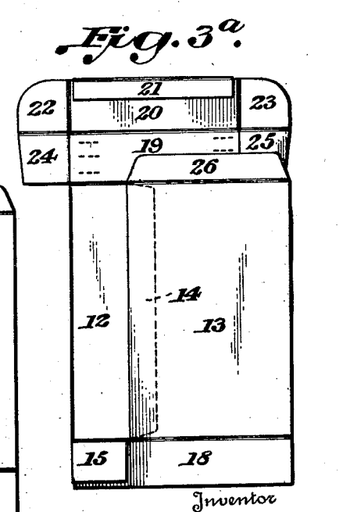
Fig. 3a is a plan view of the blank after a further folding operation by which a collapsed tube or sleeve-structure is formed which may be fed into the container-forming machine.
Figures 3B, 4, 5, 6, 7, 8:
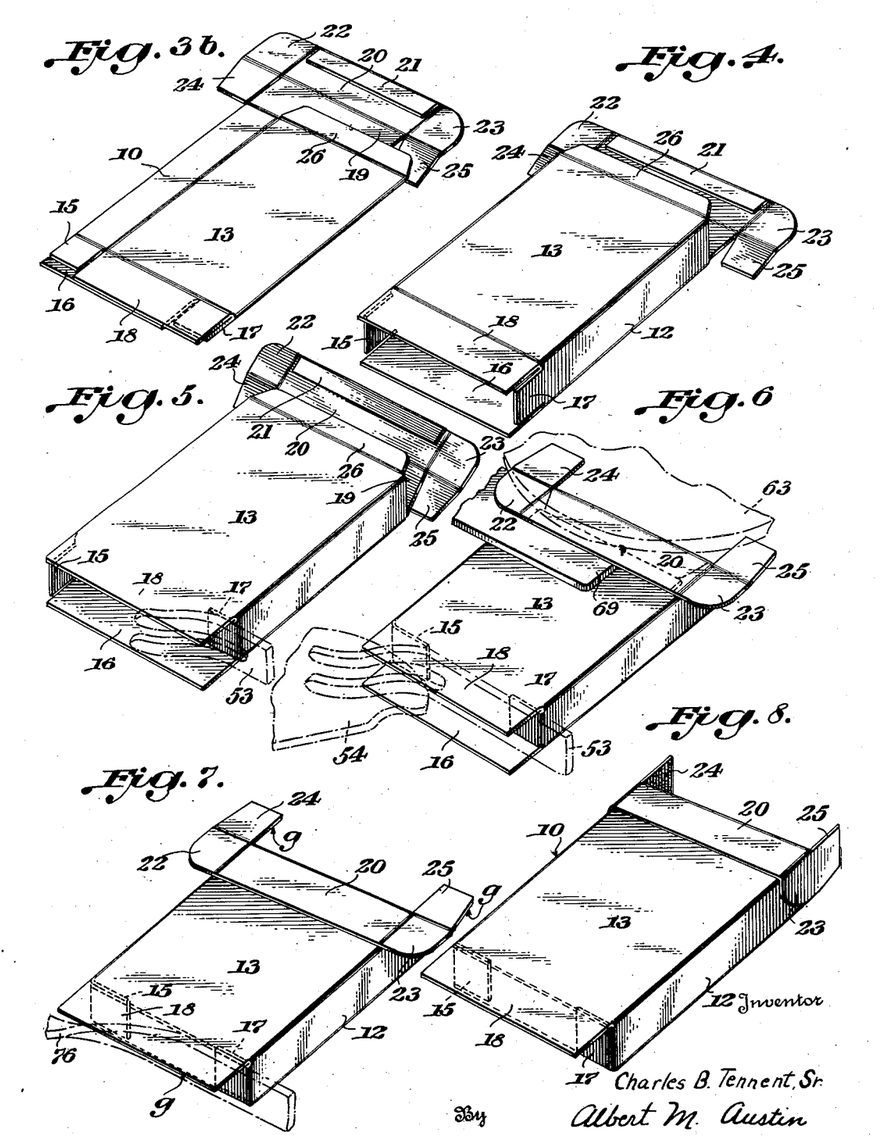
Fig. 3b is a perspective view of the blank shown in Fig. 3a after a preparatory tab bending operation.
Fig. 4 is a perspective view of the container blank of Fig. 3 after expanding and bending operations by the machine.
Fig. 5 is a perspective view of the expanded container blank as it appears at a stage at which one bottom flap is folded in and the cover structure is in the process of being folded.
Fig. 6 is a perspective view of the container after the folding-in of a second bottom flap and the folding-over of the locking flap of the cover.
Fig. 7 is a perspective view of the container after the folding-in of a third bottom flap preparatory to gluing operations at the bottom and cover structure.
Fig. 8 is a perspective view of the container after the gluing operations, and after performance of a further folding operation on the cover structure.

After application of glue the cover side panels 23 and 22 are folded into contact with the respective side wall panels 12 and 10 (not visible), as illustrated in Fig. 8.

Figures 9, 13B:
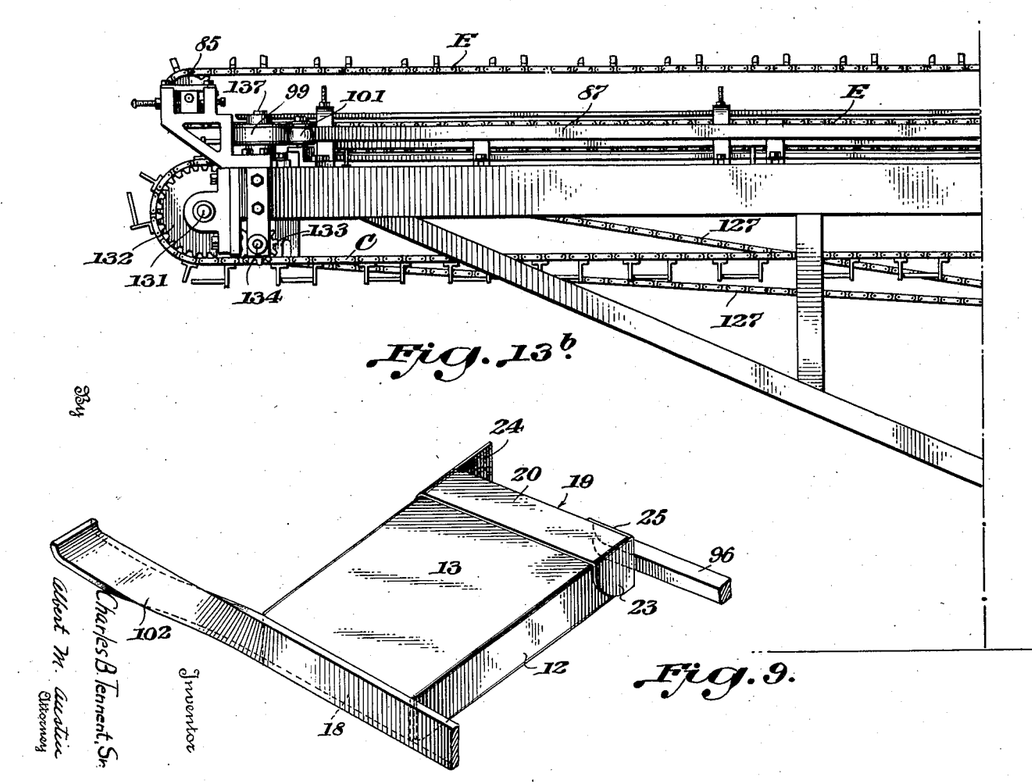
Fig. 9 is a perspective view of the container at a further advanced stage of assembly in which the last bottom flap is folded inwardly and a cover flap has been folded into final position.
Fig. 13b is an elevational view of the other side of the delivery-end of the machine.

Thereafter the bottom wall structure is completed by folding the outer bottom flap 18 into adhesive contact with the inner bottom flap 16, as shown in Fig. 9. Substantially simultaneously the leading securing tab 25 is pressed into adhesive engagement with the cover top panel 19 (not visible).

Figures 10, 11, 13B:
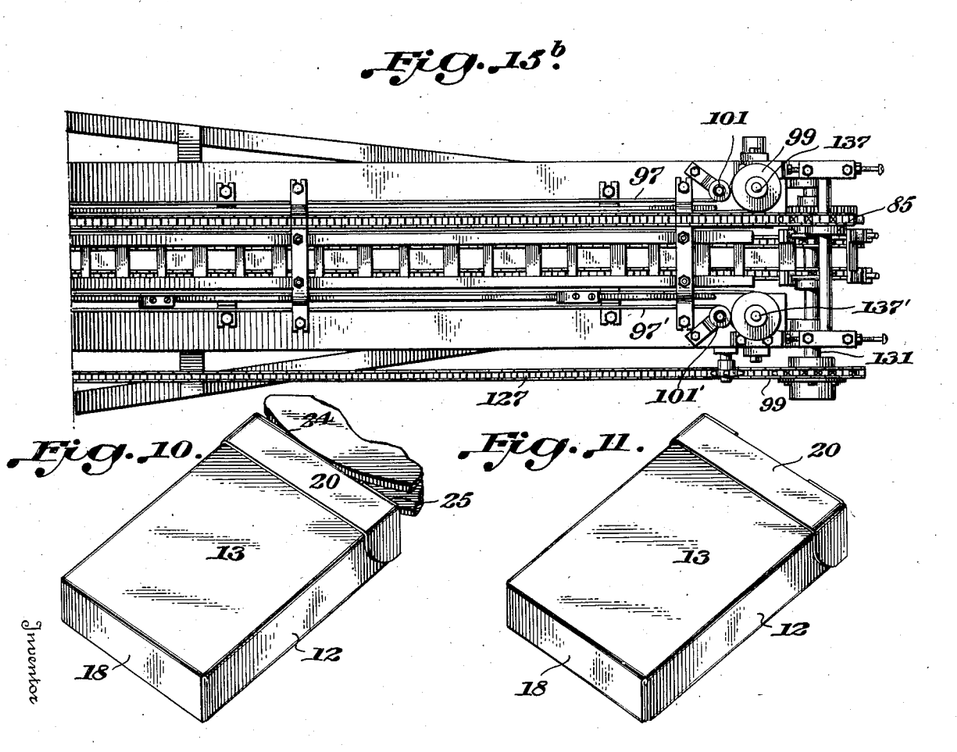
Fig. 10 is a perspective view of the container during performance of the final folding operation at the cover.
Fig. 11 is a perspective view of the completed container.

The cover structure is completed by folding the trailing securing tab 24 into adhesive engagement with the cover top panel 19 (not visible), as shown in Fig. 10.

Thus completed, the container travels through the machine for an appropriate time between suitable mechanism maintaining the outer bottom flap 18 and the securing tabs 24 and 25 in the proper position to permit the glue to set. Thereafter the completed container is discharged from the machine in the form shown in Fig. 11 ready for filling with merchandise.

Figure 12A:
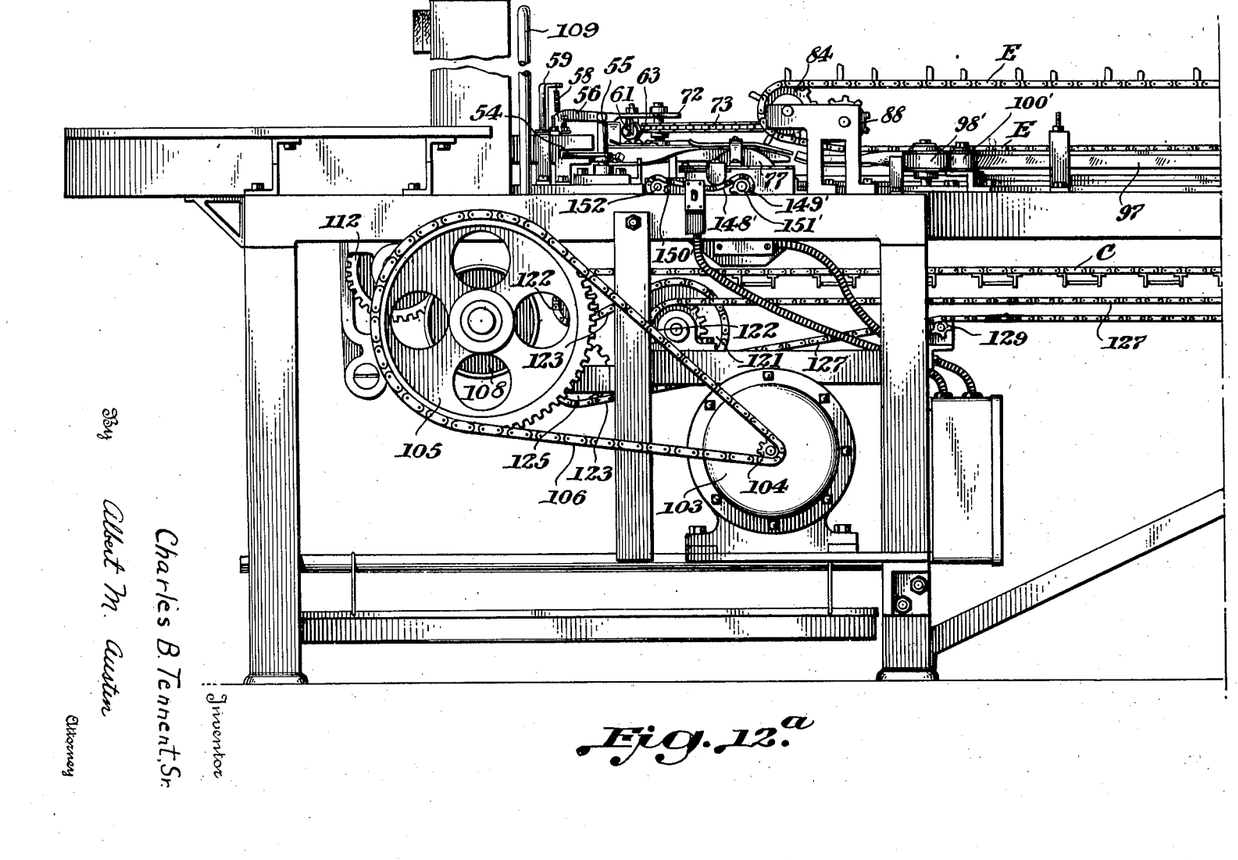
Fig. 12a is an elevational view of one side of the head-end of the container-forming machine.

The machine shown in Figs. 12 ff. comprises, basically, a supporting structure A, a drive mechanism B, a conveyor C advancing container blanks D through the machine, and various mechanisms hereinafter described in greater detail for performing the individual folding and gluing operations.

Figure 13A:
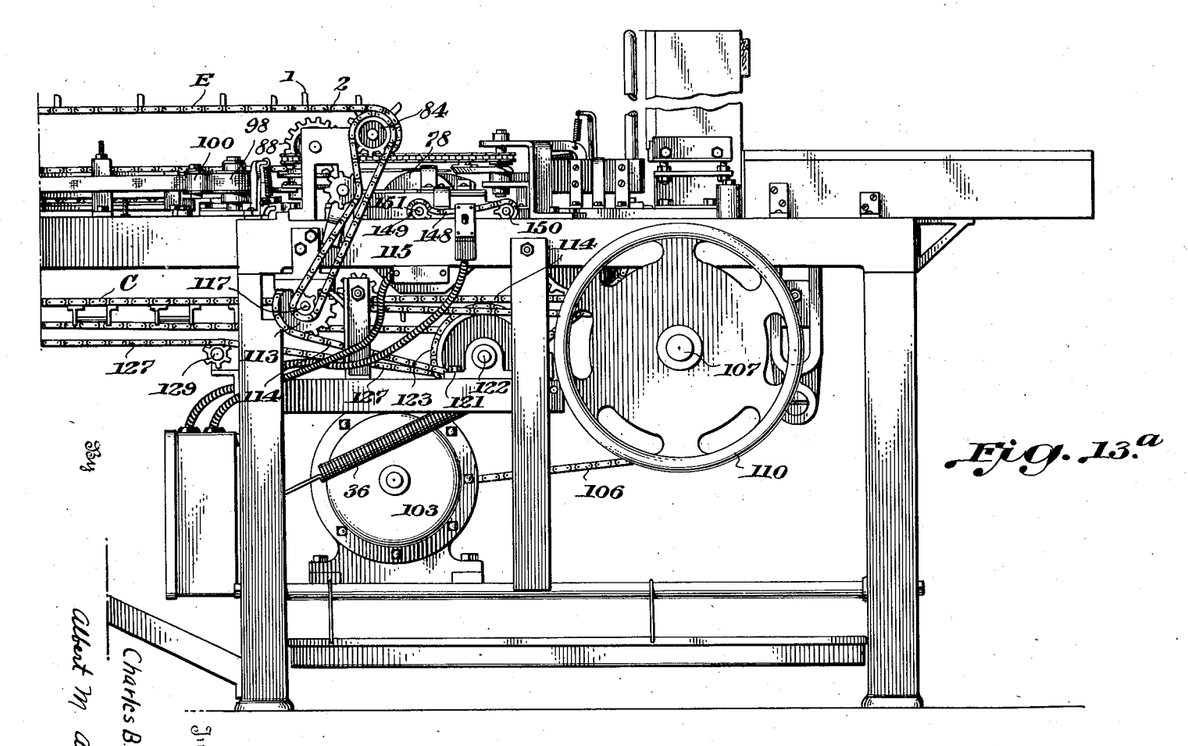
Fig. 13a is an elevational view of the other side of the head-end of the machine.
Figure 14:
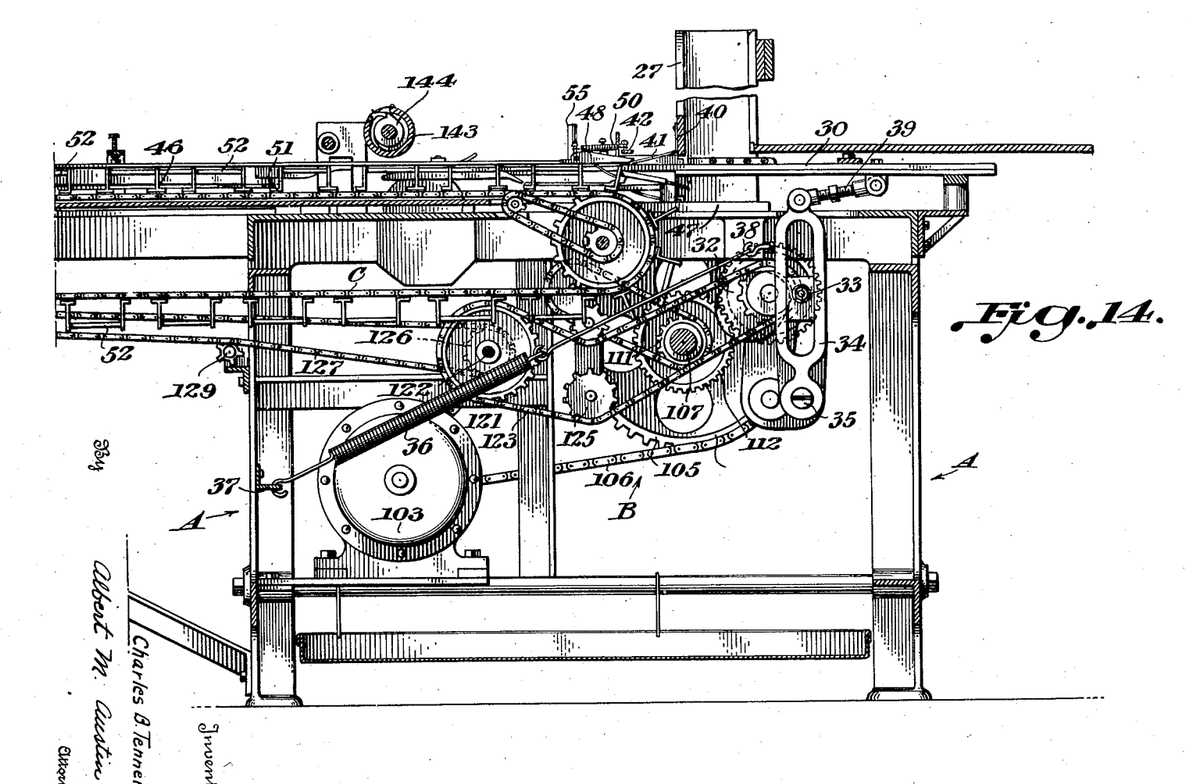
Figure 15A:
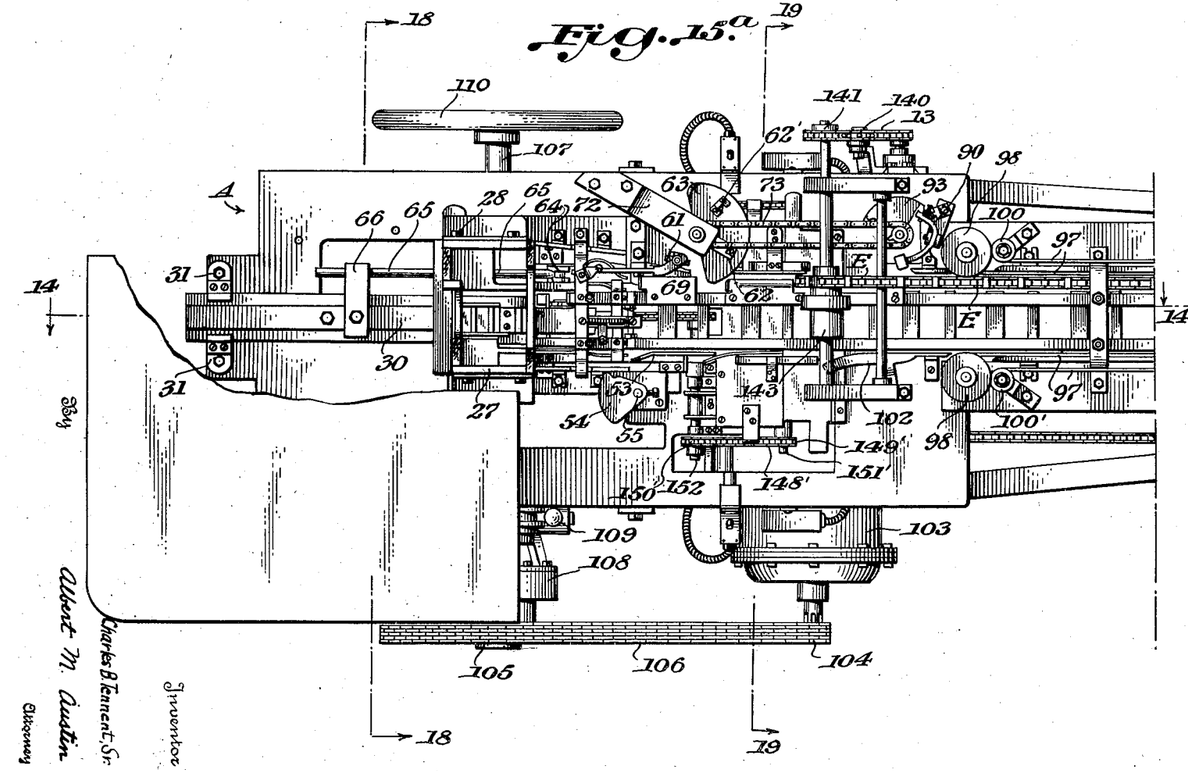
Fig. 15a is a plan view of the head-end of the machine, a part being shown as broken away.
Figure 16:
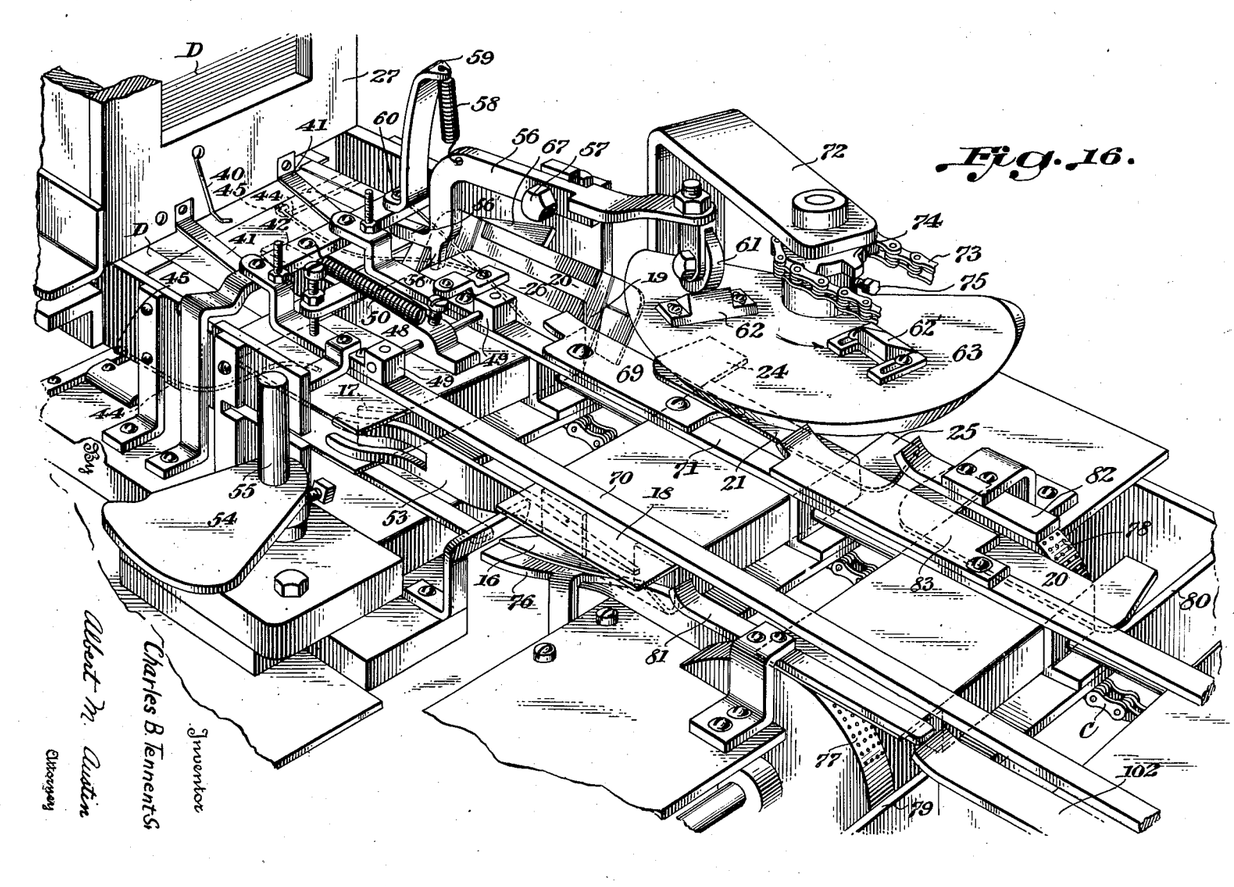
Fig. 16 is an enlarged perspective view showing mechanism at the head-end of the machine.

Referring more particularly to Figs. 13a, 14 and 16, the prepared collapsed blanks shown in Fig. 3 are placed in a magazine 27 which is secured to the supporting structure A by bolts 28. The collapsed container blanks D in the magazine 27 are fed by gravity into the path of a top projection 29 of a reciprocable plunger 30 mounted in suitable guides 31 for longitudinal sliding movement on the supporting structure A.

The top projection 29 is preferably provided with a knife edge 29' which is so arranged that the projection catches only one container blank at a time.

The plunger 30 is driven by a cam and lever mechanism shown in Fig. 14 and includes a cam 32 acting on a pin or roller 33 on a rock arm 34. The rock arm 34 is pivotally mounted at 35 and urged into contact with the periphery of the cam 32 by a spring 36 secured with one end to the rock arm 34 at 38 and with the other to the supporting structure A at 37. The cam 32 thus imparts a rocking movement to the rock arm 34 which is transmitted to the plunger 30 by a connecting link 39 causing the plunger 30 to move back and forth.

Figure 20:
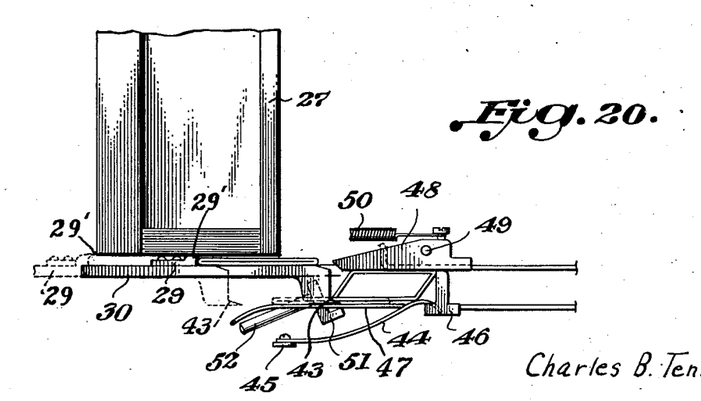

During its backward movement the top projection 29 of the plunger recedes behind the bottom opening of the magazine thus permitting the lowermost container blank to drop onto the plunger by gravity. The blank is caught by the top projection 29 during the forward movement of the plunger and is advanced towards the conveyor C until it comes into the reach of a spring 40. The spring 40 prevents the return of the blank D with the plunger 30 during the return stroke. The advancing blank D is further deflected downwardly by guide strips 41 terminating at a bracket 42. When the plunger 30 reaches its rearmost position the advanced blank drops by gravity onto a forward knife-edge projection 43 of the plunger 30 with its trailing edge, and onto upwardly sloping guide wires 44 with its leading edge. The guide wires 44 are secured to the supporting structure of the machine at 45 with one end, the other end of the guide wires being free and adapted to be deflected downwardly during a succeeding phase of operation. (See also Fig. 20.)

During the next forward stroke of the plunger the advanced blank is moved upwardly and forward until its leading edge strikes a lug 46 of the continuously running conveyor C causing the blank to become expanded to a tubular structure. During the expansion the guide wires 44 are deflected and the expanded blank is guided between guide rails 47 at the bottom and a hold-down lever 48 on the top.

The hold-down lever 48 is pivotally mounted at 49 and is urged against the expanded blank by a spring 50 secured to the lever 48 and the bracket 42.

The cam 32 is so shaped as to impart to the plunger 30 two distinct phases of forward speed. During the first phase the plunger moves at a rate faster than the rate of advance of the lug 46 on the conveyor C, thereby causing the blank to become expanded. During the second phase the plunger 30 moves at a rate equal to that of the conveyor C thereby maintaining the blank expanded until the succeeding lug 51 (Fig. 20) on the conveyor bears against the blank and maintains it in expanded condition for its further advance through the machine.

The conveyor C carries two forms of lugs which alternate. The first lug 46 is of substantially T-shaped cross-section and precedes the container blank. The second lug 51 follows an expanded blank and is of substantially L-shaped cross-section. The second lug 51 is preferably provided with spacer rods 52 adapted to bear against the succeeding T-shaped lug 46 during the level run of the conveyor for maintaining the lugs vertically erect and preventing misalignment of the erected container during the machine operations.

As the erected blank advances under the hold-down lever 48 folding operations are performed on the bottom and cover structure substantially simultaneously, as is shown in Fig. 16.

Referring first to the bottom structure, the container blank moves against a plow 53 which folds the bottom tab 17 inwardly. The plow 53 is forked to permit a rotary tucker 54 driven by a shaft 55 to pass between the forked ends of the plow 53. As the blank advances (see also Fig. 6) the rotary tucker 54 folds in the trailing bottom tab 15 after which both bottom tabs 17 and 15 slide along the straight portion of the plow 53 maintaining the tabs in position.

Figures 12B, 23:
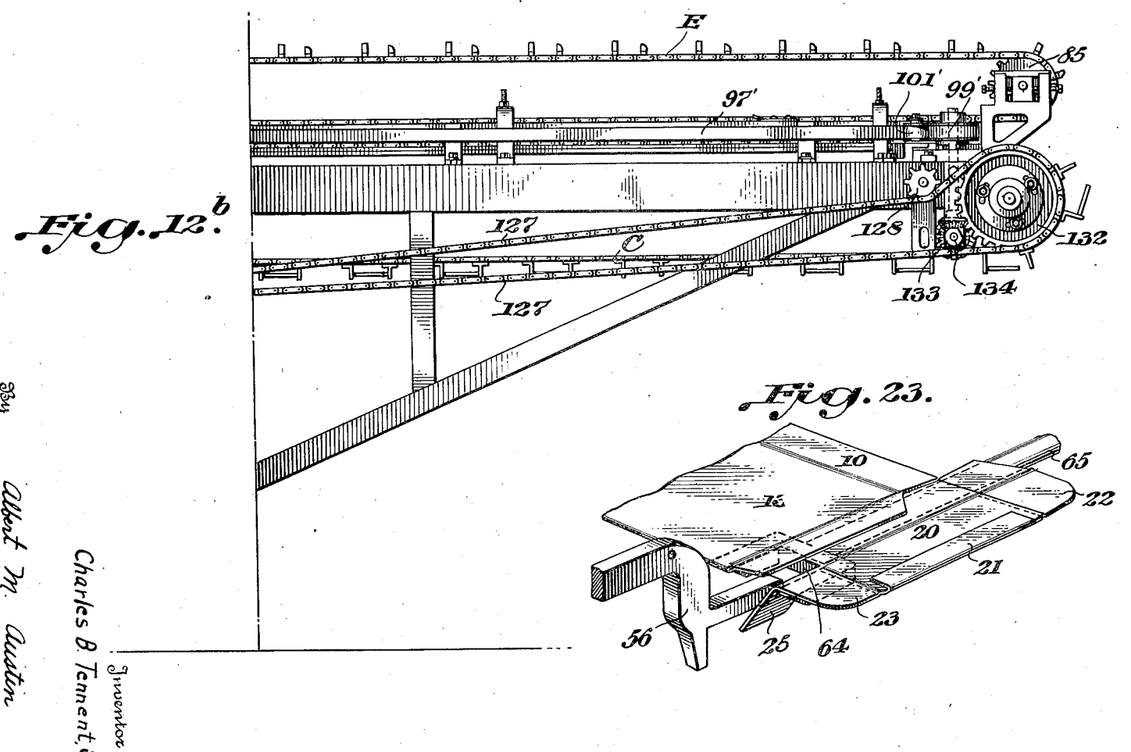
Fig. 12b is an elevational view of one side of the delivery-end of the machine.

Referring now to the cover structure, the leading securing tabs 24 and 25 are preferably first bent downwardly to facilitate the succeeding folding operations (see Figs. 4 and 23). This is accomplished by a periodically operated gooseneck lever 56 pivotally mounted at 57 and acted upon by a spring 58 connected between the lever 56 and a post 59 secured to the bracket 42 at 60. The lever 56 carries a roller 61 at one end which is in the path of cams 62 and 62' mounted on a continuously rotating sweep 63. The other end of the lever 56 is provided with extensions 56' and 56" which act upon the securing tabs 24 and 25. When the cam 62 hits the roller 61 the lever 56 is tilted against the action of the spring 58 and bears down on the leading securing tab 25 of the blank immediately prior to its expansion. The cover structure of the blank is at this moment supported by a forked support 64. The support 64 is carried on the end of a rod 65 mounted on the plunger 39 by a bracket 66 so as to move back and forth with the plunger (see Fig. 23).

Figure 21:
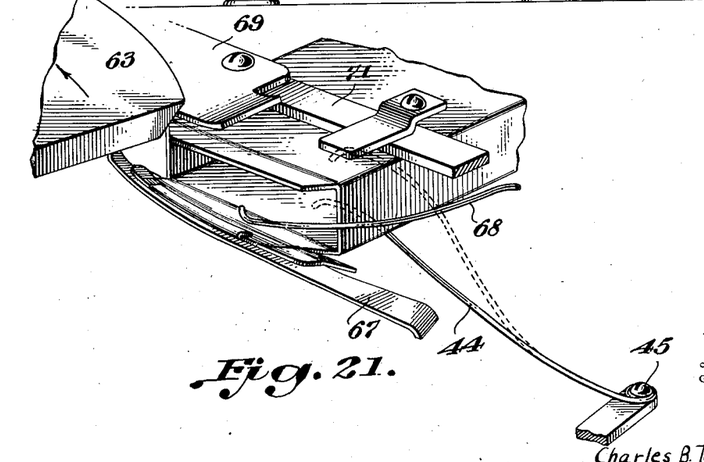

After expansion and advancement of the blank toward the discharge end of the machine, the second cam 62' acts on the lever 56 which bears down upon the trailing securing tab 24 with its extension 56''. At this moment the cover structure moves against a stationary sweep 67 which acts as a support cooperating with the lever extension 56'' and further folds the cover panels 19 and 20 upwardly, as is also shown in greater detail in Fig. 16. As the cover panels 19 and 20 are being folded upwardly they strike the locking tab 26 which is also folded upwardly together with the cover panels 19 and 20. A resilient guide wire 68 (Fig. 21) bears against the inside surface of the cover panels 19 and 20 and urges the cover panels 19 and 20 against the sweep 67.

After the cover panels 19 and 20, together with the locking tab 26, are bent upwardly by the sweep 67 they move into the reach of the rotary sweep 63 which folds the cover front panel 20 and the locking tab 26 into a substantially horizontal and interlocking position over a sword 69 mounted on one of the guide rails 70 and 71 under which the expanded container blanks advance (see also Fig. 6).

It will be apparent that the frictional engagement of the stationary sweep 67 with the panels 19 and 20 of the cover structure tends to retard the same with respect to the body of the container held firmly between the conveyor lugs 46 and 51. This retardation results in a distortion or misalignment of the cover structure with respect to the body of the container.

The misalignment is corrected by the rotary sweep 63 which subsequently engages the cover front panel 20. The rotary sweep 63 is mounted in a bracket 72 and is driven by a chain 73 running over a sprocket 74. The sweep 63 moves at a greater linear speed at the point of engagement with the cover front panel 20 than the conveyor. By reason of the frictional engagement between the rotary sweep 63 and the cover front panel 20 the previously caused misalignment is corrected by a corresponding advancement of the cover front panel 20 with respect to the body of the container carried by the conveyor. The amount of advancement depends on the frictional engagement between the rotary sweep 63 and the cover front panel 20 and is adjustable by moving the rotary sweep 63 on its shaft closer toward or further away from the cover front panel 20. A set screw 75 secures the sweep 63 to its shaft.

While the folding operation is being performed by the rotary sweep 63 the bottom structure of the container comes into the reach of a stationary sweep 76 folding the inner bottom flap 16 upwardly, as is also shown in Fig. 7.

At this stage the outer bottom flap 18 extends horizontally at the bottom end, and the securing tabs 24 and 25 extend horizontally at the cover end of the container. In this position the partially folded container blank is moved past glue wheels 77 and 78 which project from glue pots 79 and 80. The glue pots may be electrically heated and be thermostatically controlled. The glue wheels 77 and 78 apply adhesive to the inside surfaces of the outer bottom flap 18 and of the securing tabs 25 and 24 which are urged against the periphery of the glue wheels 77 and 78 by guide bars 81 and 82. During the application of glue the cover front panel 20 is held in position by a further guide member 83 secured to the rail 71.

Figure 17:
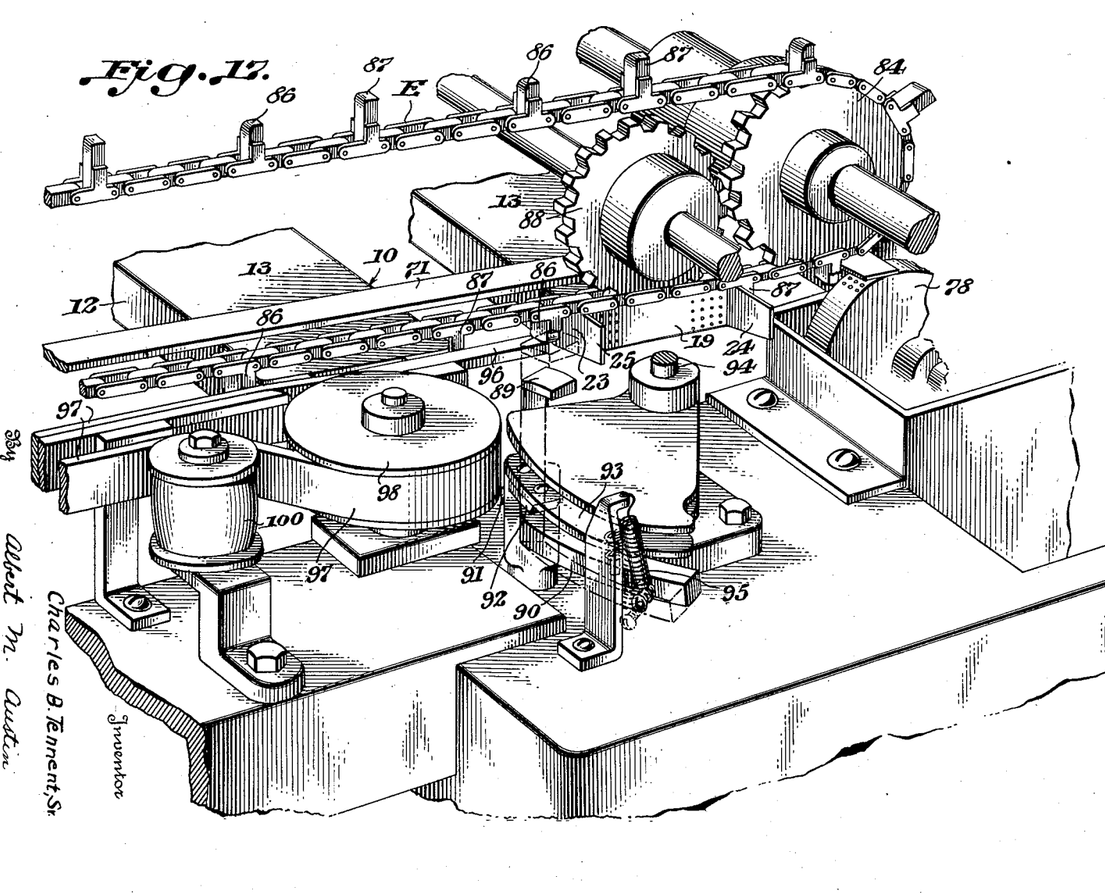

After leaving the glue wheels 77 and 78 the partially folded container blank moves into the reach of a second conveyor or folding chain E. Referring particularly to Figs. 12, 13 and 17, the folding chain E is trained around sprocket wheels 84 and 85 at the head and discharge ends of the machine respectively. The folding chain E moves at the same rate as the conveyor C and carries a plurality of short lugs 86 and long lugs 87 which alternate. The inner run of the chain moves proximate to the run of the conveyor C carrying the container blanks and in the same direction as the container blanks. The inner run of the chain E is deflected by an idler wheel 88 so as to slope downwardly toward the blanks between the end sprocket 84 and the idler 88, whereafter it continues parallel with the upper run of the conveyor C carrying the container blanks.

As the container blanks move towards the sloping portion of the chain E between the wheels 84 and 88, a short lug 86 bears down on the leading cover side panel 23 folding it down until it lies flat on the side wall panel 12. Immediately thereafter the succeeding long lug 87 bears down upon the trailing cover side panel 22 folding it into contact with the opposite side wall panel 10.

As the container advances the lugs 86 and 87 hold the cover side panel 22 firmly in place for the final folding operations performed on the securing tabs 24 and 25 of the cover structure. During the further advancement the weight of the folding chain E rests on the cover front panels 20 thereby maintaining these panels in contact with the front wall panels 13 which they overlie.

Prior to the folding of the leading securing tab 25 into adhesive contact with the cover top panel 19 the position of the tab 25 and of the adjoining cover side panel 23 is corrected with respect to the body of the container so that upon folding the securing tab 25 will align properly with the cover top panel 19. This is accomplished by a vertically movable kicker 89 which forms one end of an L-shaped lever 90 pivotally mounted at 91. The lever 90 is tilted periodically by a cam member 92 secured to the underside of a two-bladed rotary tucker 93 mounted on a continuously rotating shaft 94. As the cam member 92 strikes the free end of the lever 90, the free end is moved downwardly and the kicker 89 is moved upwardly against the action of a spring 95 which normally maintains the kicker in a depressed position. As the kicker 89 is lifted it strikes the bottom edge of the securing tab 25, pushing the securing tab upwardly a sufficient amount to cause proper alignment of the securing tab 25 in the succeeding folding operation.

After the positional correction of the securing tab 25 the tab moves against a stationary plow 96 folding the securing tab 25 into adhesive engagement with the cover top panel 19. Immediately thereafter the two-bladed rotary tucker 93 folds the trailing securing tab 24 onto the cover top panel.

It will be noted that during the folding operation performed by the rotary tucker 93 the cam member 92 has left the free end of the L-shaped lever 90 causing the kicker 89 to move into its lowermost position under the action of the spring 95 and clearing the path of the rotary tucker 93.

As the securing tabs 25 and 24 leave the plow 96 they come under the action of a continuously driven belt 97 trained around wheels 98 and 99 at the head and discharge ends of the machine, respectively, and maintained under proper tension by suitable adjustable idler pulleys 100 and 101. The belt 97 maintains the securing tabs 25 and 24 pressed firmly against the cover top panel 19 permitting the glue to set before the container is finally discharged from the discharge end of the machine.

While the folding operations are being performed on the securing tabs 25 and 24, the outer bottom flap 18 of the container moves into the reach of a stationary sweep 102 folding the bottom flap 18 downwardly onto the inner bottom flap 16.

As the outer bottom flap 18 leaves the sweep 102 it comes into the reach of a belt 97' trained around wheels 98' and 99' at the head and discharge ends of the machine, respectively, and maintained under proper tension by idler pulleys 100' and 101'. The belts 97 and 97' are driven by power driven wheels 99 and 99' and move at the same rate as the conveyor C and the folding chain E.

The length of the path during which the ends of the container are maintained under pressure between the belts 97 and 97' is sufficiently long to permit the glue to set before the completed container reaches the discharge end of the machine.

Figure 22:
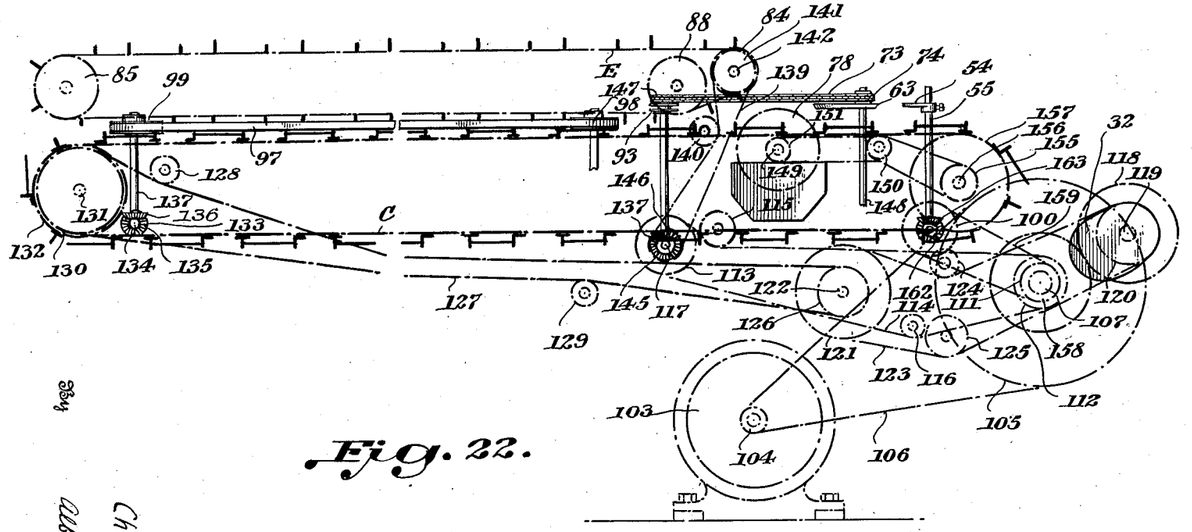

The drive mechanism B of the machine is diagrammatically shown in Fig. 22 and includes a suitable electric motor or other prime mover 103 mounted in the supporting structure A (not shown in Fig. 22 for reasons of clarity). The motor 103 has a pulley 104 on its shaft and drives a large wheel 105 over a Morse chain 106.

Figure 18:
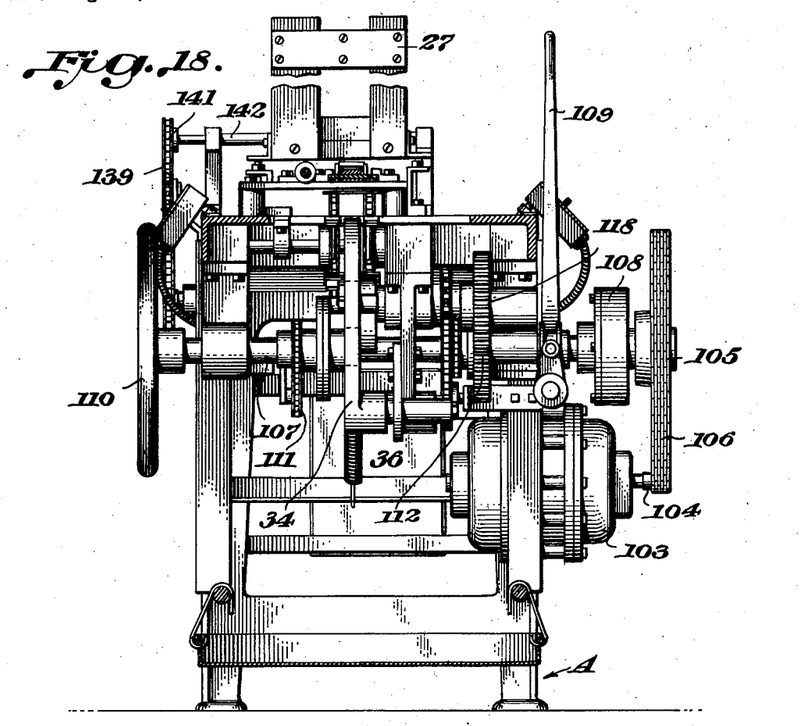

The wheel 105 is freely rotatable on a shaft 107 and may be engaged therewith or disengaged therefrom by a suitable clutch 108 operable by a hand lever 109 (see also Fig. 18). The other end of the shaft 107 carries a hand wheel 110 permitting slow manual operation of the machine while the clutch 108 is disengaged.

The shaft 107 carries further a chain gear 111 and a spur gear 112. The chain gear 111 drives a second chain gear 113 through a chain 114 trained over idlers 115 and 116. The chain gear 113 is fixedly mounted on a shaft 117 and drives further mechanism which will be described later.

The spur gear 112 meshes with a second spur gear 118 on a shaft 119 which carries the cam 32 for the operation of the plunger 30. The shaft 119 carries a further chain gear 120 which drives a second chain gear 121 on a shaft 122 over a chain 123 running over idlers 124 and 125. A further chain gear 126 on the shaft 122 drives the conveyor C through a chain 127 trained over idlers 128 and 129 and a large chain gear 130 on a shaft 131 at the discharge end of the machine. The shaft 131 carries a driving end wheel 132 for the conveyor C. A small chain gear 133 engages the drive chain 127 for the conveyor C near the discharge end of the machine. The small chain gear 133 is mounted on a shaft 134 and drives a bevel gear 135 meshing with a second bevel gear 136 on a shaft 137. The upper end of the shaft 137 carries the drive wheel 99 for the belt 97 (see also Fig. 13a). A second set of bevel gears (not shown) is mounted on the shaft 134 and drives in a similar manner a shaft 137' for the drive wheel 99' of the second belt 97'.

Returning now to the head end of the machine, the shaft 117 carrying the chain driven gear 113 carries a further chain gear 138 over which a chain 139 is trained. The chain 139 runs over an idler 140 and drives a chain gear 141 on a shaft 142. The shaft 142 carries the head-end sprocket wheel 84 of the chain E.

Figure 19:
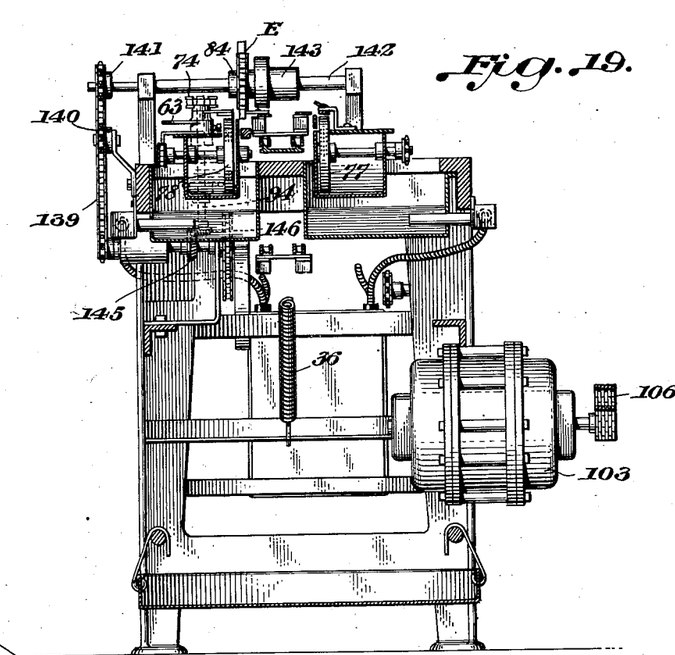

The sprocket wheel 84 is driven by the shaft 142 over a clutch 143 including a ratchet mechanism 144 (see also Figs. 14 and 19) insuring the proper phase relationship between the chain E and the conveyor C. The shaft 117 which drives the chain E also carries a bevel gear 145. The bevel gear 145 meshes with a second bevel gear 146 on the shaft 94 which carries the rotary tucker 93 and a pinion 147 around which the chain 73 is trained. The chain 73, in turn, drives the rotary sweep 63 by means of a pinion 74 (see also Fig. 16).

The glue wheel 78 is driven by a chain 148 running over pinions 149 and 150 respectively, the pinion 149 being secured to the glue wheel shaft 151 and the pinion 150 being mounted on a glue wheel shaft 152. The shaft also drives the second glue wheel 77 through a similar chain and pinion arrangement (Fig. 12a) including pinions 149' and 150' and chain 148'. The shaft 152 carries a chain gear 153 driven from a chain 154, the other end of which runs over a chain gear 155 on a shaft 156. The shaft 156 carries a large sprocket wheel 157 over which the head end of the conveyor C is trained.

The shaft 107 which carries the large chain wheel 105 for the Morse chain 106 also carries a small chain gear 158 driving a chain 159. The chain 159 runs over a second chain gear 160 on a shaft 161 carrying a bevel gear 162. The bevel gear 162 meshes with a second bevel gear 163 on the shaft 55 which carries the rotary tucker 54.

The drive mechanism just described operates the main conveyor C, the folding chain E, and the side belts 97 and 97' at equal linear speeds. The phase relation between the chain E and the conveyor C, that is, the relative position of the lugs on the chain E and the conveyor C, is so adjusted that the lugs 86 and 87 on the folding chain E bear down upon the cover side panels 23 and 22 at the proper place when the erected container blanks move into the reach of the lugs on the folding chain E. If the chain E is manually moved while the machine is stationary, which, of course, is only possible when no containers interlock the folding chain E and the main conveyor C, the folding chain remains stationary upon starting of the machine until it is carried along by the clutch 143. The clutch 143 through its ratchet mechanism insures the proper phase timing of the chain E with respect to the conveyor C.

The containers discharged from the machine may be carried away by a suitable means such as a conveyor, chute, turntable or the like, to a station where the containers are opened, the contents inserted, and reclosed.

The container-forming machine hereinbefore described operates reliably at high production speed and requires for its normal operation only one operator who may divide his attention between two similar machines and whose sole activity is limited to the periodic refilling of the magazine 27 with prepared collapsed container blanks.

While the various novel features of the invention are jointly employed in the machine hereinbefore described, it will be understood that they may be employed with equal benefit, jointly or separately, in other forms of container-forming machinery, and that various omissions, substitutions and changes may be made in the described machine without departing from the spirit of the invention.

What is claimed is:

1. In a carton forming machine, the combination of means for advancing a carton blank through the machine; a stationary member frictionally engaging a hinged portion of said blank thereby causing misalignment; and a movable member frictionally engaging said hinged portion for correcting the misalignment caused by the stationary member, the movable member having a linear speed at the point of engagement with the blank greater than the rate of advance of said blank.

2. In a carton forming machine, the combination of a conveyor for advancing a carton blank through the machine; a stationary sweep frictionally engaging a hinged portion of said blank to fold the same and causing misalignment because of frictional retardation of said portion; and a movable member for frictionally engaging said hinged portion, the movable member having a linear speed at the point of engagement with the blank greater than the rate of advance of said conveyor, thereby advancing said hinged portion with respect to said conveyor and correcting said misalignment.

3. In a carton forming machine, the combination of a conveyor for advancing a carton blank through the machine; a stationary sweep frictionally engaging a hinged portion of said blank to fold the same about a score line substantially parallel to the path of advance of the blank, the stationary sweep causing misalignment because of frictional retardation of said portion with regard to said conveyor; and a rotary sweep for frictionally engaging said hinged portion, the rotary sweep having a linear speed at the point of engagement with the blank greater than the rate of advance of said conveyor, thereby advancing said hinged portion with respect to said conveyor and correcting said misalignment.

4. In a carton forming machine the combination of a conveyor for advancing a carton blank through the machine; a stationary sweep frictionally engaging a hinged portion of said blank to fold the same about a score line substantially parallel to the path of advance of the blank, the stationary sweep causing misalignment because of frictional retardation of said portion with regard to said conveyor; a rotary sweep for frictionally engaging said hinged portion, the rotary sweep having a linear speed at the point of engagement with the blank greater than the rate of advance of said conveyor, thereby advancing said hinged portion with respect to said conveyor and correcting said misalignment; and means for adjusting the rotary sweep with respect to said blank so as to increase and decrease the frictional engagement therebetween.

5. In a machine for the folding of carton blanks expanded into a hollow structure, said blanks having a cover portion for closing the expanded blank at one end and a tab protruding from the cover portion, the tab being adapted to be folded about a score line into adhesive contact with the end wall of said cover portion, the combination of a conveyor for advancing said blank; a sweep for folding said tab about said score line; and a reciprocable tab engaging member before said sweep for engaging and moving said tab at right angles to the direction of advance of said blank.

6. In a machine for the folding of carton blanks expanded into a hollow structure, said blanks having a cover portion for closing the expanded blank at one end and a tab protruding from the cover portion, the tab being adapted to be folded about a score line into adhesive contact with the end wall of said cover portion, the combination of a horizontal conveyor for advancing said blank; a sweep for folding said tab about said score line; a vertically reciprocable tab engaging member before said sweep for engaging and moving said tab at right angles to the direction of advance of said blank to adjust said score line with respect to said hollow structure; and means for operating said tab engaging member in periodic timed relationship with the advance of said conveyor.

7. A machine for the making of cartons having a hinged cover adapted to be intermittently opened and closed, the carton cover comprising a hinged top panel, a front panel, two side panels hinged to one of said panels and two side panels hinged to one of said panels and two securing tabs for connecting said side panels with the other of said panels, the machine comprising, in combination, a conveyor for gripping carton blanks and advancing the expanded blanks through the machine; means for folding the cover panels including a stationary member frictionally engaging one of said cover panels thereby causing misalignment, and a movable member frictionally engaging one of the cover panels for correcting the misalignment caused by the stationary member, the movable members having a linear speed at the point of engagement with the panel greater than the rate of advance of the blank by said conveyor; means for folding the side panels; and means for adhesively securing said tabs to connect said side panels with the other of said panels.

8. A machine for the making of cartons having a hinged cover adapted to be intermittently opened and closed, the carton cover comprising a hinged top panel, a front panel, two side panels hinged to one of said panels and two securing tabs for connecting said side panels with the other of said panels, the machine comprising, in combination, a conveyor for gripping carton blanks and advancing the blanks in expanded condition through the machine; means for folding the cover panels including a stationary sweep frictionally engaging one of said cover panels to fold it about a score line substantially parallel to the path of advance of said blank, the stationary sweep causing misalignment because of frictional retardation of said panel with regard to said conveyor, a rotary sweep for frictionally engaging said front panel, the rotary sweep having a linear speed at the point of engagement with the front panel greater than the rate of advance of said conveyor thereby advancing said front panel with respect to said conveyor and correcting said misalignment; means for adjusting the rotary sweep with respect to said front panel so as to increase and decrease the frictional engagement therebetween; means for folding said side panels; and means for securing said tabs to connect said side panels with the other of said panels.

9. A machine for the making of cartons having a hinged cover adapted to be intermittently opened and closed, the carton cover comprising a hinged top panel, a front panel, two side panels hinged to one of said panels and two securing tabs for connecting said side panels with the other of said panels, the machine comprising, in combination, a conveyor for advancing expanded carton blanks through the machine; means for folding the cover panels including a stationary member frictionally engaging one of said cover panels thereby causing misalignment, and a movable member frictionally engaging one of the cover panels for correcting the misalignment caused by the stationary member, the movable member having a linear speed at the point of engagement with the panel greater than the rate of advance of the blank; means for folding the side panels, said means including, a second conveyor above said first conveyor, the second conveyor including an inner run proximate said first conveyor and running in the same direction as blanks on said first conveyor; an end wheel near the feed and discharge station, respectively, for supporting said second conveyor; a deflector wheel engaging said inner run of the second conveyor intermediate said end wheels to deflect the inner run towards said first conveyor, the inner run approaching said first conveyor from the feed station and extending thereafter substantially parallel with the first conveyor to the discharge station; lugs on said second conveyor so spaced as to bear down on and fold said side panels as the blank moves within the reach of said downwardly deflected portion of the second conveyor; and means for driving said first and second conveyor at equal linear speeds and in a predetermined phase relationship; and means for adhesively attaching said securing tabs to connect said side panels with the other of said panels.

10. A machine for the making of cartons having a hinged cover adapted to be intermittently opened and closed, the carton cover comprising a hinged top panel, a front panel, two side panels hinged to said front panel, and securing tabs hinged to said side panels, the machine comprising, in combination, a conveyor for advancing expanded carton blanks through the machine; means for folding the cover panels including a stationary member frictionally engaging one of said cover panels thereby causing misalignment, and a movable member for correcting the misalignment caused by the stationary member, the movable member having a linear speed at the point of engagement with the panel greater than the rate of advance of the blank; means for folding the side panels; and means for folding said securing tabs into adhesive engagement with said top panel, said means including a sweep for engaging the leading tab and folding it onto said top panel, and a reciprocable tab engaging member before said sweep for engaging and moving said tab at right angles to the direction of advance of said blank prior to engagement by said sweep.

11. In a machine for the folding of carton blanks comprising a panel adapted to be folded about a score line and a tab extending from the panel beyond said score line and separated from the remainder of the blank by a cut on the far side of the score line with respect to the panel, said cut extending to the score line, the combination of means for advancing the blank through the machine; means for folding said panel about the score line; and means in advance of said folding means for bending said tab out of the plane of the remainder of the blank preparatory to the folding by said folding means, whereby a folding of said tab by the folding means is avoided.

12. In a machine for the folding of carton blanks comprising a panel adapted to be folded about a score line and a tab extending from the panel beyond said score line and separated from the remainder of the blank by a cut on the far side of the score line with respect to the panel, said cut extending to the score line, the combination of means for advancing the blank through the machine; means for folding said panel about the score line; and means in advance of said folding means for bending said tab out of the plane of the remainder of the blank preparatory to the folding by said folding means, said bending means including a periodically operated plunger member bearing down on said tab, whereby a folding of said tab by said folding means is avoided.

CHARLES B. TENNENT, Sr.

REFERENCES CITED

The following references are of record in the file of this patent:

UNITED STATES PATENTS

| Number | Name | Date |
|---|---|---|
| 733,460 | Cormack | July 14, 1903 |
| 958,252 | Jenkins | May 17, 1910 |
| 1,775,753 | Evans et al. | Sept. 16, 1930 |
| 1,784,571 | Bergstein | Dec. 9, 1930 |
| 1,873,059 | Smith et al. | Aug. 23, 1932 |
| 1,890,653 | Molins | Dec. 13, 1932 |
| 1,935,269 | Jones | Nov. 4, 1933 |
| 1,974,408 | Bergstein | Sept. 25, 1934 |
| 1,989,286 | Milmoe | Jan. 29, 1935 |
| 2,147,994 | Schwinger | Feb. 21, 1939 |
| 2,149,111 | Bergstein | Feb. 28, 1939 |
| 2,196,982 | Cox | Apr. 16, 1940 |
| 2,209,111 | Chalmers | July 23, 1940 |
| 2,227,439 | Carruth | Jan. 7, 1941 |
| 2,329,353 | La Bombard | Sept. 14, 1943 |